INVENTORS
ROLF MOEN
MARK S. DALQUIST

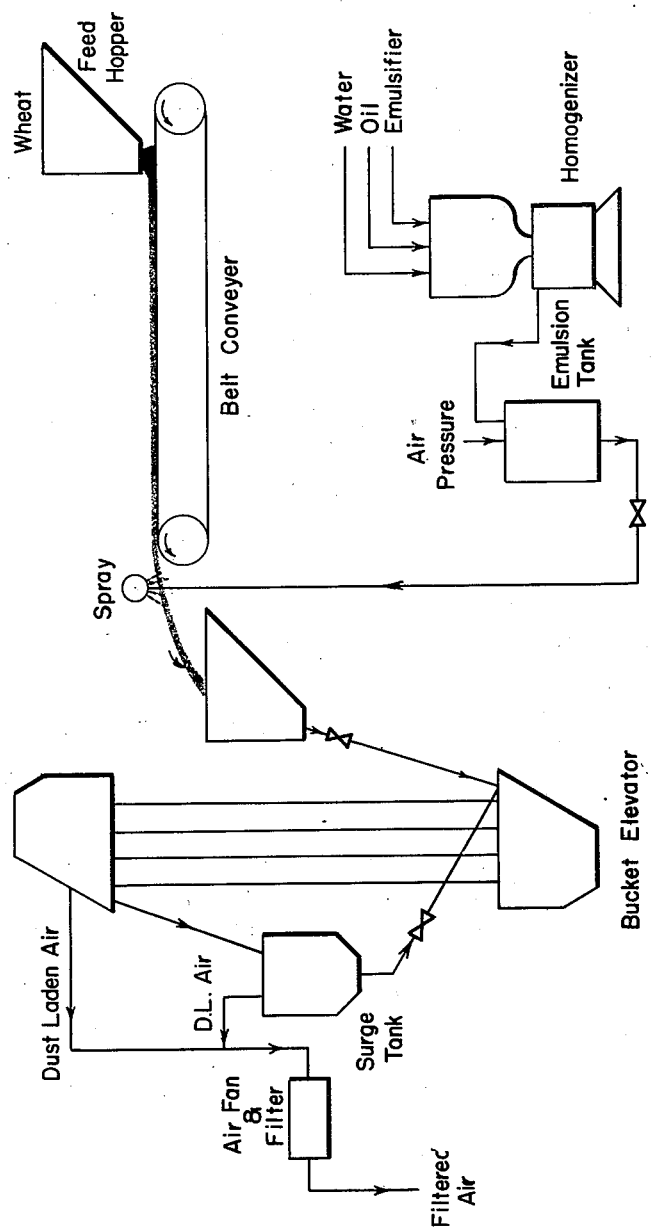

INVENTORS
ROLF MOEN
MARK S. DALQUIST
BY Anthony A. Juettner
ATTORNEY

INVENTORS
ROLF MOEN
MARK S. DALQUIST

Patented Feb. 12, 1952

2,585,026

UNITED STATES PATENT OFFICE 2,585,026

GRAIN HANDLING

Rolf Moen and Mark S. Dalquist, Minneapolis, Minn., assignors to General Mills, Inc., a corporation of Delaware Application October 4, 1948, Serial No. 52,676

5 Claims. (Cl. 99—80)

The present invention relates to the reduction in the dust problem during the handling of grains and involves a process of treating the grain for the purpose of overcoming this difficulty.

The health and explosive hazards of grain dust evolved during the handling of grain are well known. Many persons are allergic to grain dust and as a result of the constant dust conditions existing during the handling of grain, many such allergic persons have had to seek occupations in other industries. Furthermore, dispersions of dust in air are highly explosive and numerous instances of serious explosions followed by fire have been reported.

The problem of dust in the handling of grains has existed for a long period of time. As a result, numerous attempts have been made to overcome the difficulties. These attempts, however, have been far from successful.

The treatment of grain for this purpose by means of added materials presents numerous problems. The material employed must result in a material reduction in the amount of dust released during handling of the grain without introducing additional problems. In order to reduce explosion hazards it is necessary that no material be employed which might contribute to explosibility or inflammability. The process employed must be relatively simple and automatic since manpower is usually short during the harvest season when large quantities of grain are handled. The cost of the treatment must be low per unit of grain. Inasmuch as grains are used principally for food purposes, the materials must be harmless and deleterious. Furthermore, the treatment must not be detrimental to the milling or baking characteristics of the grain or to any other characteristics which are important for the particular application to which the grain is put. The discovery of a material and a process of application which met all of these requirements involved excessive experimentation. It was finally found, however, that the treatment of grain with an aqueous oil emulsion was satisfactory for the production of the desired results.

It is, therefore, an object of the present invention to provide a process for the treatment of grain with an aqueous oil emulsion for the purpose of allaying dust during handling.

Figure 1:
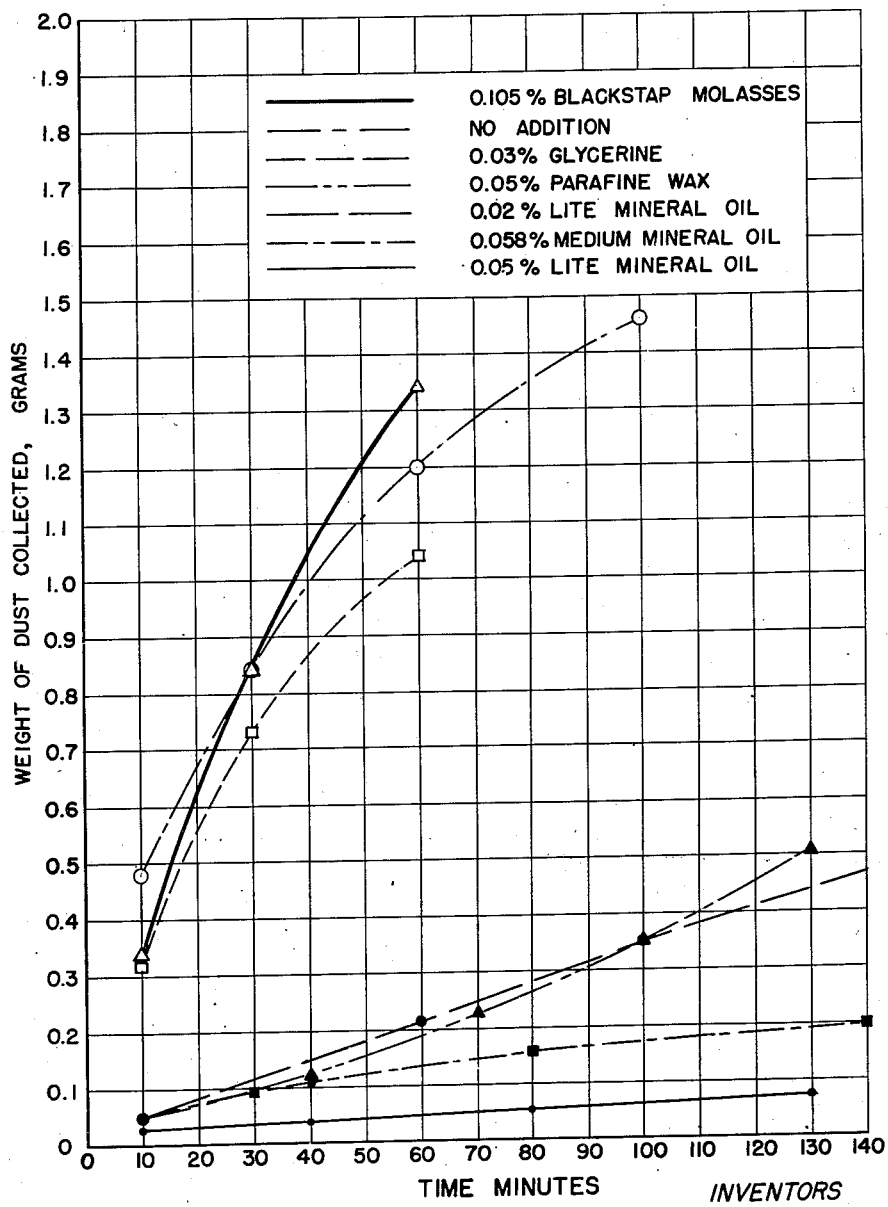

In attempting to solve this particular problem, various materials were tried. Early attempts were made with various hygroscopic materials such as molasses and glycerin which one might expect to be effective, but these were found to be ineffective. In Figure 1 of the drawings is illustrated a series of curves showing the effect of various treatments of wheat upon the amount of dust collected in the handling of the wheat and comparing these treated wheats with untreated wheat. The data for these curves was obtained by placing two kilograms of wheat in a small drum and rotating the drum about a horizontal axis. Compressed air was then blown through the drum into a paper thimble filter which was weighed at intervals to determine the quantity of dust collected. The treated wheat samples were hand-sprayed with the materials indicated in the figure, and these samples together with a control sample of untreated wheat, were tumbled in the drum, the dust released being collected and weighed at intervals. The curves in Figure 1 for the blackstrap molasses and the glycerin indicate that they result in practically no improvement over the untreated grain. At the same time the curves for the mineral oil emulsion products show a phenomenal reduction in the amount of dust collected during the treatment.

Tests were likewise made to determine the effect on milling and baking characteristics of wheat treated with these aqueous oil emulsions. For this purpose a two kilogram sample of the dusty wheat was sprayed with 1% of its weight of an aqueous emulsion containing 2% light mineral oil. A further sample of wheat was sprayed with 1% of an aqueous emulsion containing 4% of mineral oil. These samples, together with an untreated control sample, were then milled and baking tests were conducted on the flour produced. It was found that the oil-spray treatment had no significant effect on milling characteristics and had no discernible effect on baking qualities.

For the purpose of determining the relative effectiveness of various modifications in a manner more nearly approximating a commercial installation, the layout diagrammatically illustrated in Fig. 2 was constructed. According to the apparatus illustrated in this figure, an aqueous oil emulsion was prepared in a homogenizer and then pumped to a pressure vessel. From this pressure vessel the emulsion was sprayed onto a layer of wheat during its trajectory as it left a conveyor belt and prior to its deposit in a hopper. The treated wheat was then run to a bucket elevator and there elevated and dropped into a surge tank and again recycled for various periods of time. Dust-laden air was withdrawn from the surge tank and from the head of the bucket elevator and passed through a filter where the quantity of dust was determined by weighing the filter bag.

Figure 4:
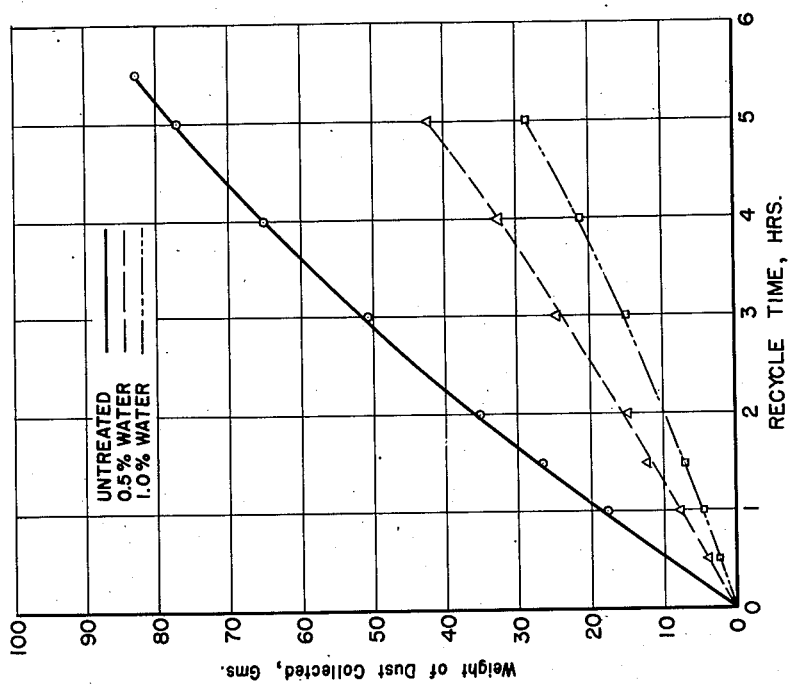
Figure 3:
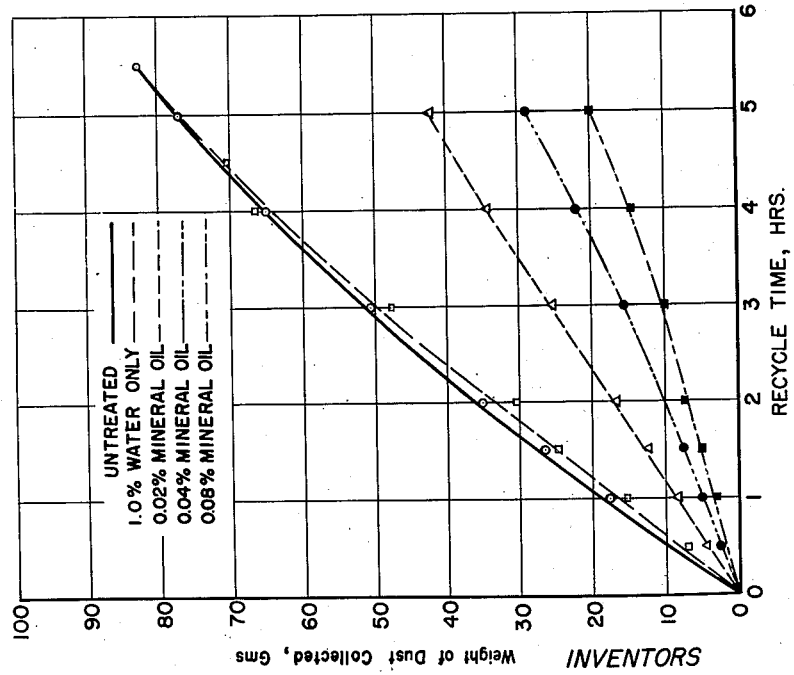

Figs. 3 and 4 present self-explanatory curves illustrating the effect of various variables on the process as carried out in the apparatus of Fig. 2. Thus Fig. 3 shows that the treatment of the grain with 1% of water produced no noticeable effect upon the dust problem. Likewise other curves in Fig. 3 illustrate that as little as 0.02% of mineral oil added in the form of an aqueous emulsion which was added as 1% of the weight of the grain, produced a material reduction in the amount of dust. Likewise 0.04% and 0.08% of mineral oil likewise added in aqueous emulsions as 1% of the weight of the grain, resulted in phenomenal reductions in the amount of dust collected. The results in Fig. 4 show that where the amount of oil is maintained constant at 0.04% the reduction in dust is improved if the oil is added as an emulsion of 4% concentration rather than as an emulsion of 8% concentration.

For commercial operation it has been found desireable to employ 1% of the aqueous oil emulsion based on the weight of the wheat, the emulsion containing approximately 4% of mineral oil. The use of this emulsion results in an increase in the moisture content of the wheat by about .6–.7% which in most instances is about the maximum which can be permitted without presenting storage and preservation difficulties. The remainder of the water may be lost by evaporation, etc. Where the wheat being treated is of a subnormal moisture content, it will be appreciated that the amount of moisture which may be added can be in excess of this amount and in general it is desirable to use as much water as possible inasmuch as this appears to effect a more uniform distribution of the mineral oil, and therefore a more efficient reduction in the amount of dust. In those instances in which the wheat being treated is of an abnormally high moisture content, it may be desirable to use a more concentrated emulsion, for example, one containing 8% of mineral oil. This, however, is not to be preferred inasmuch as the distribution of an emulsion of this concentration is more difficult. It will be appreciated that the quantities of emulsion set forth in these relative concentrations are for the treatment of grain where no auxiliary process for changing the moisture content of the wheat is employed. It will also be appreciated that in cases of abnormally high moisture content in the wheat before treatment, the wheat may be dried and then treated. This, however, entails further expense and in most instances it is possible to treat the grain in its field-dry condition by regulating the amount of emulsion and the concentration of emulsion as described above.

While it is possible to vary the concentration of the oil in the emulsion, it is also possible to vary the amount of oil applied to the wheat. From the standpoint of cost and efficiency of operation, it has been found that 0.04% of mineral oil based on the weight of the wheat represents about the best balance between cost and effectiveness of treatment. Reduction of the amount of oil employed to 0.02% of the weight of the wheat results in a material improvement in the dust condition, but is not as effective as the 0.04% of mineral oil. On the other hand, 0.08% of mineral oil results in a much more effective dust removal than the 0.04%, but involves added cost. In general it has been found that the treatment is effective by employing mineral oil in a concentration of about 0.02% to 0.08% based on the weight of the wheat, and used in the form of an emulsion of concentration varying between .2% and 8%. In most instances the more dilute the emulsion, the more effective the treatment, and it is desirable to employ as dilute an emulsion as the moisture content of the grain being treated will permit. The use of 0.04% of mineral oil based on the weight of the wheat and used in the form of a 4% emulsion has been found to be particularly effective considering all factors involved.

For the emulsion a wide variety of mineral oils may be employed. Where the wheat or any of its by-products are intended to be used for food purposes, it is desirable to employ a high grade mineral oil, such as a U. S. P. grade or some similar grade. Where the grain or its by-products are to be employed industrially, other grades of mineral oil, including less pure and less costly grades may be employed as long as they do not interfere with the uses to which the grain is subsequently to be put.

The emulsion is preferably made by employing an emulsifying agent which is desirably in the range of approximately 2% based on the weight of the oil. Here again, the emulsifying agent should be of an edible nature where the wheat and its by-products are intended for food uses. Typical of such edible emulsifying agents is propylene glycol laurate. Similarly, where the wheat or its by-products are used for industrial purposes it is possible to use any emulsifying agent which does not affect the use to which the grain may subsequently be put. A typical emulsion is one composed of 95.92% water, 4% mineral oil, and 0.08% proplyene glycol laurate. These may be mixed together in a suitable tank equipped with an agitator, and it is found that emulsification takes place without the necessity for any excessive agitation.

It is also possible to prepare an emulsion of the mineral oil and water mechanically without the use of any emulsifying agent. This usually involves the use of some emulsifying device such as a colloid mill, and this procedure may be used wherever such equipment is available.

For application of the emulsion to the grain any method which will effect uniform distribution of the emulsion on the grain may be employed. In view of the relatively small quantity of emulsion employed, it is usually preferred to spray the emulsion onto a moving stream of grain. Usually it is desirable to have the grain agitated at the time that it is sprayed with the emulsion. The application of the emulsion to the grain may be accomplished in the manner described with reference to Fig. 2 in which the spray was directed onto the trajectory of a stream of grain leaving a belt conveyor. Another procedure which was found satisfactory was the spraying of the grain in a cut-flight mixing conveyor equipped with a hood in which sprays were placed. The emulsion was sprayed onto the grain in the conveyor and the screw conveyor served to thoroughly agitate the grain and to insure complete and uniform coverage.

Figure 5:
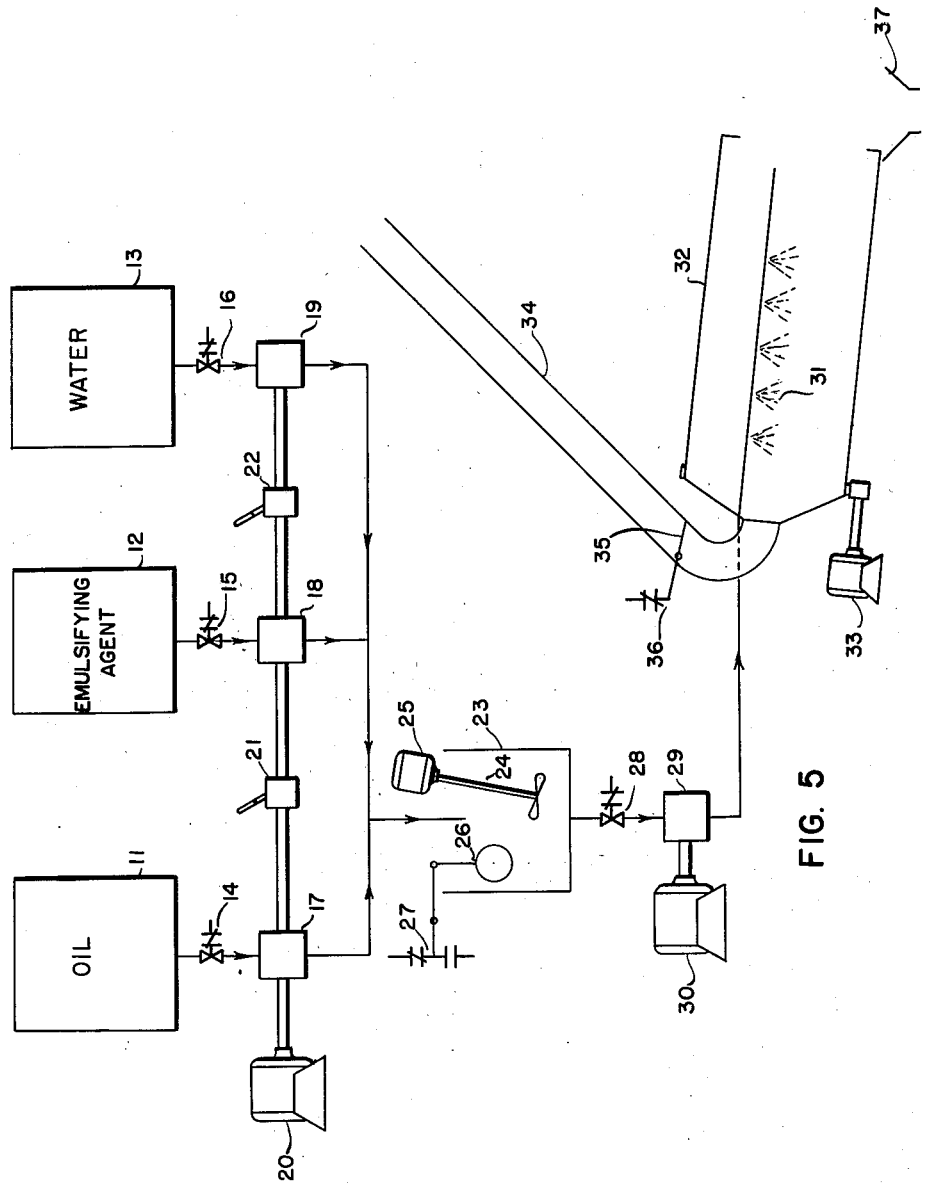

A particularly satisfactory arrangement for effecting the treatment of the grain with the aqueous oil emulsion is that diagrammatically illustrated in Fig. 5. In that figure there is provided a series of tanks 11, 12, and 13, for mineral oil, emulsifying agent and water respectively. The discharge from each of these tanks is controlled by means of solenoid valves 14, 15 and 16. There is also provided a series of proportioning pumps 17, 18 and 19 for the respective discharges from the supply tanks, all of which are driven by the common motor 20 which through variable speed mechanisms 21 and 22 serve to control the output of each of the pumps. The combined streams from the three pumps are discharged into emulsifying tank 23 equipped with stirrer 24 driven by motor 25. The tank 23 is also equipped with float 26 which actuates switch 27. The discharge from the emulsifying tank 23 is controlled by solenoid valve 28 which discharges into pump 29 driven by motor 30. The discharge from pump 29 is conducted to sprays 31, which are mounted within the rotating drum 32 driven by motor 33. A grain inlet spout 34 is provided to conduct the grain from the source of supply to the rotating drum 32. Vane 35 is operatively connected to switch 36. A discharge hopper 37 is provided at the discharge end of the rotating drum 32 to introduce the discharged grain back into the conveying system.

Solenoid valves 14, 15, 16, 28, and motors 20, 25, 30 and 33 are all connected across the line in parallel. Switch 36 is connected in the line ahead of the above mentioned solenoid valves and motors. When grain enters the spout 34, it strikes vane 35 and closes switch 36. This energizes all the motors and the solenoid valves and starts the entire apparatus in operation. When grain ceases to flow in spout 34, the vane 35 returns to the closed position and opens switch 36, thereby shutting off all of the electrical units previously described. Switch 27 is connected in series with motor 20 and solenoid valves 14, 15 and 16. When float 26 is in normal operating position, switch 27 is closed and the motor 20 and solenoid valves 14, 15 and 16 are energized. If the emulsion tank 23 becomes too full, the float rises and opens switch 27, thereby de-energizing motor 20 and solenoid valves 14, 15, and 16. The remainder of the apparatus continues to function until the level of the emulsion in the tank 23 goes down enough to permit float 26 to lower to the point where switch 27 again becomes energized. Should the level in the tank 23 become dangerously low indicating that the feeding of the oil, water, and emulsifying agent are at too low a rate, the float 26 falls and a further element of switch 27 sounds an alarm, thereby permitting the delivery rates of pumps 17, 18 and 19 to be adjusted to the requirements of the particular operation. The above described diagrammatically illustrated apparatus is substantially automatic in operation under ordinary working conditions. It automatically comes into operation whenever any grain is to be treated and shuts itself off when the flow of grain has been stopped.

While various modifications of the invention have been described, it is to be understood that other variations are possible without departing from the spirit of the invention.

We claim as our invention:

1. Process of treating grain which comprises applying thereto an emulsion of water and mineral oil, the amount of mineral oil added to the grain being within the approximate range of 0.02% to 0.08% based on the weight of the grain.

2. Process of treating grain which comprises applying thereto an emulsion containing water and mineral oil, the amount of mineral oil being within the approximate range of 0.02% to 0.08% based on the weight of the grain, the emulsion containing from about 2% to about 8% of mineral oil based on the weight of the emulsion.

3. Process of treating grain which comprises adding thereto approximately 0.04% of mineral oil in the form of an emulsion in water, the concentration of mineral oil in the emulsion being within the approximate range of 2-8%.

4. Process of treating grain which comprises applying thereto approximately 1% of an emulsion containing water and mineral oil, the concentration of the mineral oil being approximately 4% of the weight of the emulsion.

5. Process of treating grain which comprises spraying on said grain, while said grain is being agitated, an emulsion containing mineral oil and water, the concentration of the oil in the emulsion being approximately 4% of the weight of the emulsion and the amount of emulsion employed being approximately 1% of the weight of the grain being treated.

ROLF MOEN.
MARK S. DALQUIST.

REFERENCES CITED

The following references are of record in the file of this patent:

UNITED STATES PATENTS

| Number | Name | Date |
|--------|------|------|
| 854,003 | Somlo | May 21, 1907 |
| 2,143,306 | Earle | Jan. 10, 1939 |
| 2,166,974 | Shields | July 25, 1939 |
| 2,423,449 | Heald | July 8, 1947 |